April 8, 1969    N. J. THEMELIS ET AL    3,437,475
PROCESS FOR THE CONTINUOUS SMELTING AND CONVERTING
OF COPPER CONCENTRATES TO METALLIC COPPER
Filed Jan. 4, 1965

INVENTORS
NICKOLAS J. THEMELIS
PAUL SPIRA

By Cushman, Darby & Cushman
Attorneys

United States Patent Office 3,437,475
Patented Apr. 8, 1969

3,437,475
PROCESS FOR THE CONTINUOUS SMELTING AND CONVERTING OF COPPER CONCENTRATES TO METALLIC COPPER
Nickolas J. Themelis, Beaconsfield, Ontario, and Paul Spira, Montreal, Quebec, Canada, assignors to Noranda Mines, Limited, Toronto, Ontario, Canada
Filed Jan. 4, 1965, Ser. No. 423,257
Claims priority, application Canada, Nov. 23, 1964, 717,049
Int. Cl. C22b 5/10, 15/06; C22d 7/00
U.S. Cl. 75—76     12 Claims

ABSTRACT OF THE DISCLOSURE

A process for continuously producing copper from concentrates by providing in a furnace separate but connecting smelting and converting, white metal blowing, copper settling and slag separation zones along the length of the furnace and a furnace which has molten metal therein. The concentrates are fed into the smelting zone and the resultant co-current flow of matte and slag is controlled as it flows continuously along the length of the furnace. Oxidizing gas is introduced into the molten material in a controlled manner as the molten material moves along the length of the bath. The resultant copper is allowed to settle and is withdrawn while the slag is treated to provide a relatively copper-clean slag.

---

This invention relates broadly to the smelting and conversion of copper concentrates to metallic copper. More particularly, the invention is directed to a process for the continuous smelting and conversion of copper concentrates to metallic copper.

The invention described herein is intended to replace the conventional batch blowing smelting process (which will be described hereinafter for purposes of comparison) by a continuous copper reduction process such that the smelting and converting stages occur partly simultaneously and partly in sequence in a single reactor vessel in which the concentrates are introduced continuously at one end, while the slag and copper metal are removed continuously at the other end of the vessel.

The process of the present invention also includes the treatment of slag by reducing gases or other means with the purpose of decreasing the copper content to an acceptable level, either in an appropriate extension of the reduction reactor or in a separate vessel adjacent to the reactor, such that the slag can flow by gravity from the reactor vessel to the settling vessel.

In addition the invention embodies the treatment of the produced copper to anode copper as part of the continuous process first by oxidizing and then by reducing gases either in an appropriate extension of the reactor proper or in one or more holding furnaces heated by induction or other means.

The invention therefore comprises the continuous smelting converting and reducing of copper concentrates and subsequent treatment of the copper and slag streams which, due to the continuity of the process, occupy a small volume per unit time and may therefore be treated in flow to produce a relatively copper-clean slag stream and a copper stream suitable for anode casting.

The invention also utilizes certain aspects of present-day copper technology, in conjunction with new concepts of continuous gas-liquid processing which are up to the present time used mostly in chemical processing. The invention also includes the concept of removing copper from molten silicates by subjecting the slags to contact with highly reducing atmospheres and allowing the reduced copper to settle out of the slag.

It is known that for many years considerable thought and effort has been directed to the formulation of means for continuously converting copper matte to metallic copper but so far no satisfactory or commercially workable process has been developed. By way of explanation and comparison it may be noted that the conventional copper smelting and converting process involves melting of the concentrates and flux in a reverberatory or blast furnace wherein two separate layers are formed—a heavier one of matte ($Cu_2S$—$FeS$) and a supernatant layer of slag. The supernatant layer is allowed to settle and is cleaned of most of its copper content. The matte from the reverberatory furnace is then conveyed to the converter vessel where it is subjected to two-stage air-oxidation reaction. In the first stage of the converting reaction, oxygen reacts with FeS as follows:

$$FeS + 1\tfrac{1}{2} O_2 \rightleftharpoons FeO + SO_2 \qquad (1)$$

Any $Cu_2O$ which has been formed by oxidation of $Cu_2S$ reacts immediately with FeS according to:

$$Cu_2O + FeS \rightleftharpoons Cu_2S + FeO \qquad (2)$$

Silica flux is added to the converter in this first stage to form iron silicate slag with the FeO produced by reactions (1) and (2):

$$2FeO + SiO_2 \rightleftharpoons 2FeO \cdot SiO_2 \qquad (3)$$

The slag produced in the first stage is then skimmed from the converter and transferred to the reverberatory furnace where mixing and interaction with the furnace bath lowers its copper content from 2–3% Cu to about 0.35% in the reverberatory slag The $Cu_2S$ (white metal) which has remained in the converter is then subjected to a second blow which is believed to result in the following reactions:

$$Cu_2S + 1\tfrac{1}{2} O_2 \rightleftharpoons Cu_2O + SO_2 \qquad (4)$$

and $$2Cu_2O + Cu_2S \rightleftharpoons 6Cu + SO_2 \qquad (5)$$

with the net result of producing metallic copper.

There are technical problems which have prevented the earlier development of a continuous converting process. For example, the thermodynamics of copper conversion require that the process be carried out in two steps or stages. The first stage involves oxidation of FeS and the second oxidation of $Cu_2S$ to Cu. It had previously been concluded that the batch operation of the converter lends itself best to these reactions. In addition, it had been found that during the second stage of the process involving conversion of $Cu_2S$ to Cu what may be termed the end point of the conversion was frequently overstepped and a certain amount of copper oxidized as $Cu_2O$. This $Cu_2O$ dissolves in any slag which may be present in the converter at the time.

According to the invention a process for the continuous smelting and converting of copper concentrates to metallic copper in a single furnace involving a gradual and sequential reaction along the length of said furnace includes the steps of (a) feeding flux and the concentrates to be converted into said furnace; (b) smelting the concentrates and flux; (c) controlling the resultant flow of matte and slag in the furnace as it flows towards tapping ports formed therein; (d) introducing an oxidizing gas into the matte sufficient to effect a gradual oxidation of the ferrous sulphide; (e) continuing to introduce said oxidizing gas into the resultant white metal in a volume sufficient to effect the gradual oxidation of the copper sulphide to metallic copper; (f) allowing the copper to settle and thereafter (g) drawing off metallic copper.

Figure 1:
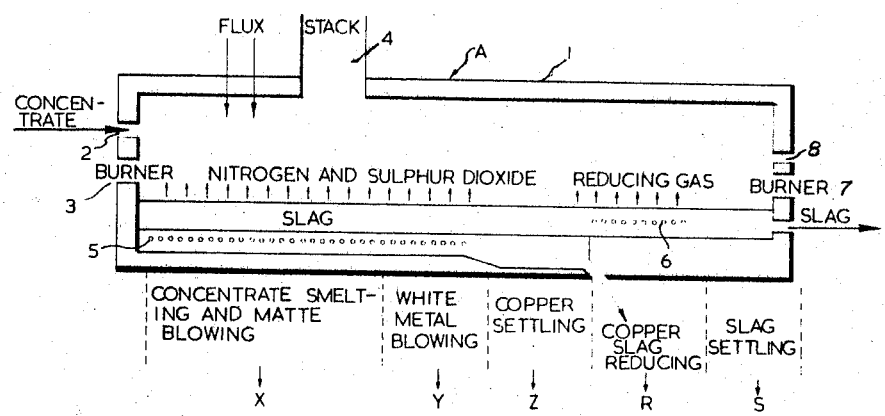
FIG. 1 is a side view of a generally horizontally disposed reaction vessel of the present invention.
Figure 2:
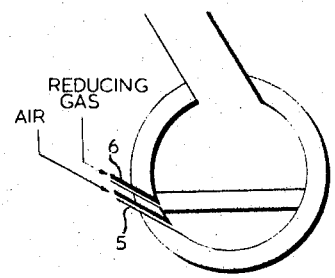
FIG. 2 is an end view of the vessel of FIG. 1.

In FIGURE 1 of the drawings the vessel designated generally at A has a refractory liner casing 1. A charging port 2 is formed in the casing 1 for the introduction of the concentrates to be reduced. A burner 3, which may be conventional in structure and operation, is also located at the charging end of the vessel. An exhaust stack 4 is provided in the normally upper portion of the vessel. It will be noted that the horizontal length of the vessel is divided up into distinct reaction zones. Firstly, there is the zone for concentrate smelting and matte blowing X, secondly a zone Y where white metal blowing takes place, thirdly the copper settling zone Z and finally the slag reduction zone R and settling zone S at the discharge end of the vessel. It should be noted, however, that the separation of these zones is only broadly indicated. They are not separate and distinct reaction zones in the sense of being physically divided by partitions or the like. Tuyeres 5 are located along the length of the vessel as illustrated. These tuyeres provide for the continuous introduction of air to ensure that the continuous aspect of the process is accomplished. Inlet means for a reducing gas is shown at FIG. 2 at 6. The additional heat required in the slag settling zone may be provided by means of either burner 7 or by supplying a sufficient amount of air through inlet 8 to burn off the excess reducing gas emerging from the slag layer.

Although the present process is continuous, a gradual and sequential reaction is maintained from the first to the second stage of blowing. This is achieved by controlled flow and oxidation of the liquid matte stream as it moves from the feeding end of the furnace towards the tapping end thereof.

Thus, the transition from the first stage involving FeS oxidation to the second stage involving $Cu_2S$ oxidation is not sudden—as it is in the presently used batch operation processes—but rather it is a gradual transition; the FeS is slowly oxidized out of the matte until it reaches the second section of the furnace where only $Cu_2S$ is present.

The invention is not limited to any particular or critical shape or size of reaction vessel or equipment and can also be applied to other types of liquid-gas reactions at high temperatures such as certain other sulphides. The following specific example is given of copper production and the continuous method of the present invention and should be considered in the light of the drawings.

PRODUCTION OF COPPER (Basis: 200 tons of copper produced/day)

Material balance

| | |
|---|---:|
| Wet concentrates _____tons/hr__ | 32.1 |
| Assumed composition: | |
| Cu _____percent__ | 26 |
| Fe _____do____ | 30 |
| S _____do____ | 33 |
| $SiO_2$ _____do____ | 4 |
| $H_2O$ _____do____ | 7 |
| Tons of matte produced (29% Cu) ____ tons/hr__ | 28.6 |
| Volume of matte (S.G.=4.1) _____ cu. ft./hr__ | 225 |
| Flux addition _____tons $SiO_2$/hr__ | 7.5 |
| Tons of slag produced _____tons/hr__ | 22.6 |
| Composition: | |
| Fe (58% FeO) _____percent__ | 45 |
| $SiO_2$ _____do____ | 30 |
| $Al_2O_3$,ZnO, etc. _____do____ | 12 |
| Volume of slag (S.G.=3.6) _____cu. ft./hr__ | 202 |
| Tons of white metal ($Cu_2S$) produced __tons/hr__ | 10.45 |
| Volume (S.G.=5.9) _____cu. ft./hr__ | 56.8 |
| Tons of metallic copper produced _____tons/hr__ | 8.35 |
| Volume (S.G.=8) _____cu. ft./hr__ | 33.5 |

Air requirements

| | |
|---|---:|
| (a) First stage blow: | |
| FeS to FeO at 95% oxygen utilization c.f.m. air__ | 15,500 |
| Volume of air per 2-inch tuyere c.f.m. of air__ | 250 |
| Present operation practice _____c.f.m.__ | 500 |
| Number of tuyeres required _____ | 62 |
| Length of reactor required (at 6-inch centres for tuyeres as present operating practice) ft__ | 32 |
| (b) Second stage blow: | |
| $Cu_2S$ to Cu at 95% oxygen utilization c.f.m. of air__ | 4,000 |
| Number of tuyeres _____ | 16 |
| Length of reactor required (6-inch centres) ft__ | 9 |

*Residence times of materials in reactor*

The reactor vessel A may be very similar in design to the convention Peirce-Smith converter. Therefore, full conversion will be achieved in the same length of time as obtained in present batch operation. Consequently, the residence time of material is considered to be about 2 hours in the first-stage blow zone X and approximately 0.5 hour in the second-stage blow zone Y. In addition, a residence time of about one hour is undertaken for the settling of copper in zone Z and about 0.5 hour for the reducing blow in the slag and one hour for the settling of the slag in zone S. The latter figure has been based on experiments on the effect of settling on copper slags. As indicated there are no separate blows as such but rather separate reactions or stages in the process resulting from the continuous blowing and introduction of air through the tuyeres 5.

HEAT BALANCE (PER HOUR OF OPERATION)

(a) Matte-blowing zone

| | B.t.u./hr. |
|---|---:|
| Heat content of liquid matte at 2200° F. __ | 22,500,000 |
| Heat content of liquid slag at 2200° F. (including 10 tons/hr. of flux) _____ | 29,400,000 |
| Heat content air input at 2200° F. _____ | 40,000,000 |
| Heat content water vapour at 2200° F. ____ | 9,700,000 |
| Heat losses (operating experience, 30 ft. converter) _____ | 6,000,000 |
| Total heat required _____ | 107,600,000 |
| Heat available from FeS reaction and formation of silicate slag _____ | 76,500,000 |
| Auxiliary heat supply at feeding end of reactor (e.g. 3 tons of coal at 42% available heat) _____ | 31,100,000 |
| Total available heat _____ | 107,600,000 |

(b) White metal-blowing zone

| | |
|---|---:|
| Heat content of added silica flux (2.5 tons) at 2200° F. _____ | 3,000,000 |
| Heat content of air at 2200° F. _____ | 10,000,000 |
| Heat losses _____ | 1,500,000 |
| Total heat required _____ | 14,500,000 |
| Heat of $Cu_2S$ reaction with oxygen (860 B.t.u.[2]/lb. Cu) _____ | 14,500,000 |
| Therefore, total available heat _____ | 14,500,000 |

(c) Copper-settling, slag-reducing, and slag-settling zones
(estimated total length required: 30 ft.)

| | |
|---|---:|
| Heat content of reducing gas (55 c.f.m. of natural gas) | 500,000 |
| Heat losses | 6,000,000 |
| Total heat required | 6,500,000 |
| Auxiliary heat source (burner on taping end of reactor, 230 c.f.m. of natural gas at 50% available heat) | 6,500,000 |

Total fuel to process:

| | |
|---|---:|
| 3 tons of coal×24,000,000 | 72,000,000 |
| 285 c.f.m.×60×1,000 | 17,100,000 |
| | 89,100,000 |

A description of process may now be considered with reference to specific example earlier discussed.

The wet (or dry) concentrates are premixed with the required proportion of the silica flux and fed into the front end of the bath of the reactor vessel A by means of any suitable feeding mechanism such as a vibrating screw feeder, a belt feeder, a Garr gun or the like. Experiments have shown that when the concentrates reach a temperature of about 1000–1100° F., reaction with the air stream from the tuyeres 5 commences and the exothermic heat of reaction brings the concentrates to the smelting and converting temperautres.

The heat balance has shown that most of the required heat in the reactor is supplied by the exothermic heat of the converting reactions. An additional heat supply in the form of a gas, oil, or coal burner may be located at the feeding or charging end of the reactor.

The reactor vessel A comprises a cylindrical vessel of about 11 ft. in internal diameter and 60 ft. length and may be of a construction similar to a Peirce-Smith converter with the exception of the raised hearth 10 at the tapping end which allows the separation of the slag and white metal layers. Tuyeres 5 continuously discharging 250 c.f.m. each are located at six-inch centres along zones X and Y of the reactor length. As in the conventional Peirce-Smith design, the reaction vessel can be rotated up to 90° so as to expose the tuyeres, in the case of interruption of air-flow. It must be visualized that raw materials are fed continuously and molten slag and copper are withdrawn continuously from the reactor furnace. Consequently, materials flow by gravity slowly past any particular point in the reactor (from left to right on FIG. 1 of the drawing).

As the concentrates melt, two layers are formed, one of slag and the other of matte, just as in the conventional reverberatory furnace. However, as the matte layer flows toward the discharge end of the vessel A, it is continuously subjected to reaction with an air-stream injected through the tuyeres, by continuous introduction of air. In practice a minimum of about 10 p.s.i. will be used. It is not intended to suggest that absolute continuity of an introduction is essential. Some small stoppage in air introduction is not critical but the continuous aspect of an introduction is to be distinguished from the separate air blows used in the batch process of the prior art. This interaction primarily oxides the ferrous sulphide content of the matte to ferrous oxide which combines with the excess silica in the slag to form a silicate slag. As noted earlier, silica is introduced in the furnace in admixture with the concentrates. An additional amount is added by suitable feeders near the central area of the furnace.

The converting reaction described above, corresponds to the "first-stage blow" in conventional copper converters with the exception that in the present invention a layer of slag exists above the matte at all times. In this respect, the reaction envisaged is identical to the final flow in the "first-stage blow" when a certain layer of slag is also found on top of the white metal-matte layer.

As a consequence of this reaction between matte and air stream, the former becomes continuously depleted of FeS until at some downstream point, the matte has been converted to white metal ($Cu_2S$).

White metal is then subjected to reaction with air through the tuyeres 5 and the equivalent of the "second-stage blow" of conventional converter operation starts taking place. This part of the reaction is identical to the "second-stage blow," with the exception that a layer of slag exists above the white metal.

As the white metal is subjected to interaction with air, it separates into a sulphur-rich and a copper-rich (98–99% Cu) phase which has a higher density and therefore precipitates as a third liquid phase toward the copper-settling section Z of the reactor vessel A.

The zone Z of the reactor vessel A is allotted for settling of this copper which is then tapped continuously into one or more small induction furnaces where it can be desulphurized and then deoxidized "on-stream" prior to casting into anodes. The slag layer flows past the copper-smelting zone into the slag-treating zone R where it is subjected to contact with reducing gases as indicated on FIGURE 1, which gases are introduced through a series of tuyeres 6. A final slag-settling zone S is provided after the reducing blow, following which the slag is skimmed or tapped continuously from the furnace. Copper which settles out of the slag flows back into the copper-settling zone Z. As an alternative a separate holding furnace may be provided whereby high copper slag is skimmed or tapped from the copper settling zone Z and is reduced by subjecting it to a blow with reducing gases and allowed to settle in order to recover its copper content in the form of a settled high grade matte tapped from the bottom of such holding furnace.

Laboratory and pilot plant experiments conducted at Noranda Research Centre having verified the essential parts of the invention as follows:

(a) Smelting—Converting

Copper concentrates were mixed with sufficient silica flux to produce a fayalite (about 30% $SiO_2$) slag on conversion. Experiments were conducted in large crucibles and also in a pilot furnace having hearth dimensions of 3 ft. wide x 7.5 ft. long. In both types of experiments, the blow was interrupted when the three phases (slag, white metal, copper) were found to co-exist in the furnace. It is significant to note that white metal and copper were found at the settling end of the furnace, while the ferrous sulphide content of the matte had not been eliminated completely in the charge end of the furnace. Thus, a concentration gradient of FeS existed in the $Cu_2S$ layer according to the requirements of the process.

These tests showed that the separation of the three phases was easily achieved and that the converted copper settles very rapidly out of the white metal, forming a very distinct interface with the latter. The metallic copper contained from 98.6% to 99% copper.

(b) Cleaning of slag

Tests were conducted in large crucibles by blowing the slag with reducing gas (partially oxidized methane) and allowing the copper to settle out of the slag. Experiments have shown that slags containing 25–30% $SiO_2$ and up to 5% Cu were cleaned by subjecting them to a blow with carbon monoxide to 0.6% Cu after treatment of only fifteen minutes. Slag could be cleaned to approximately 0.35% after a residence time of one hour.

The reducing gases emerging from the slag layer may either be exhausted or burned with air introduced at the slag-reducing zone, to provide an additional source of heat in the settling end of the reactor. An alternative method of slag cleaning which has been found satisfactory consists of spraying pyritic ore particles on the surface of the slag in the settling zone. These particles meet and the sulphide phase filters through the slag and collects fine entrained matte and copper particles. Thus, a slag of very low copper content (0.20–0.30%) can be produced.

In summary it can be stated that this concept of gradual converting along the axis of a horizontal reaction vessel is new to the copper smelting field, although it has been utilized in the chemical engineering processes.

For the first time, the various forces affecting movement of slags and mattes (inertial, gravitational, buoyancy, etc.) have been studied and correlated by dimensional analysis in order to predict and control the behavious of matte and slag in the bath.

The invention therefore presents a significant change in copper converting which provides for the continuous converting of copper although it effectively separates the first and second blows, by progressive oxidation of the matte stream. In addition, continuous converting produces a steady stream of slag which can be treated in order to decrease its copper content. In the present invention the slag is subjected to a reducing blow and then settling which reduces its copper content to an acceptable and economic level. Thus, the slag can be then discarded, dispensing with the need for a reverberatory furnace. Treatment of the slag can take place either in an appropriate extension of the same furnace or in an adjacent holding furnace. Since the slag can be cleaned to an acceptable copper content by this treatment, the second objection to continuous converting (i.e. having the slag above the $Cu_2S$ during the second blow) is overcome.

Clearly this invention represents a major advance in the field of copper smelting and conversion.

We claim:

1. A process for the continuous smelting and converting of copper concentrates to metallic copper in a furnace containing a molten bath and having a charging end and a slag tapping end, said process involving a gradual reaction along the length of said furnace and including the steps of:
   (a) feeding concentrates through the charging end and onto the surface of the bath in a smelting and matte blowing zone of said furnace;
   (b) smelting said concentrates in the matte blowing zone whereby heat produced in said matte blowing zone is efficiently utilized in the smelting process;
   (c) controlling the resultant flows of matte and slag so that they flow co-currently along the length of said furnace from said matte blowing zone towards separate tapping ports formed in said furnace for copper and slag;
   (d) introducing an oxidizing gas into the matte sufficient to effect a gradual conversion of the matte to white metal whereby the smelting and conversion reactions are effected essentially in the same matte blowing zone and the exothermic heat of the conversion reaction is utilized for said smelting;
   (e) continuing to introduce said oxidizing gas into the resultant white metal flow, said oxidizing gas being introduced in a volume sufficient to effect conversion of said white metal therein to metallic copper;
   (f) allowing said copper to settle in a copper settling zone remote from said charging end whereby said copper settling is controlled to avoid intimate contact with the matte formed at said charging end; and
   (g) drawing off metallic copper at a point intermediate said charging end and said slag tapping end.

2. A process as claimed in claim 1 including the step of introducing into the area of the charging end of said furnace a supply of auxiliary heat sufficient to facilitate the smelting process.

3. A process as claimed in claim 2 including the step of providing a molten bath of material and smelting the concentrates in intimate contact therewith.

4. A process as claimed in claim 1 including the further step of introducing silica flux into said furnace with the copper concentrates to be smelted.

5. A process as claimed in claim 1 including the step of feeding the concentrates and flux into the furnace in a substantially thin layer on the bath.

6. A process as claimed in claim 1 wherein said furnace is a rotary furnace.

7. A process as claimed in claim 1 including the further step of treating the slag to produce a relatively copper clean slag.

8. A process as claimed in claim 1 including the further step of cleaning the slag and obtaining copper therefrom by contacting the slag with reducing gases.

9. A process as claimed in claim 1 including the further steps of:
   (a) skimming off high copper slag from a copper settling zone in said furnace to a separate holding furnace;
   (b) subjecting the slag to a blow with a reducing gas;
   (c) allowing the slag to settle; and
   (d) recovering the copper content of the slag in the form of a settled high-grade matte layer.

10. A process as claimed in claim 2 including the step of directing an auxiliary supply of heat into a slag settling zone of said furnace.

11. A process as claimed in claim 2 including the step of providing additional heat in a slag settling zone of said furnace by supplying a sufficient amount of air to burn off excess reducing gases used in the slag cleaning treatment.

12. A process for the continuous production of copper comprising the steps of:
   (a) providing in a bath of molten material having a charging end and a tapping end, a smelting and matte blowing zone, a white metal blowing zone, a copper settling zone and a slag separation zone, said zones being substantially separate from but in communication with each other;
   (b) introducing concentrates substantially continuously into the molten material onto the surface of the smelting and matte blowing zone and smelting the concentrates in said zone;
   (c) causing the resultant molten material to flow substantially continuously and co-currently in a stream from the smelting and matte blowing zone to the white metal blowing zone;
   (d) introducing an oxidizing gas into the resultant molten material sufficient to effect a gradual oxidation of matte therein to white metal and whereby the smelting and conversion reactions are effected essentially in the same matte blowing zone and the exothermic heat of the conversion reaction is utilized for said smelting;
   (e) introducing an oxidizing gas into the white metal blowing zone in a volume sufficient to effect oxidation of the white metal therein to metallic copper and causing slag produced to flow substantially continuously to the slag separation zone;
   (f) allowing the resultant copper to settle in the copper settling zone; and
   (g) finally drawing off metallic copper at a point intermediate said charging end and said tapping end.

(References on following page)

References Cited

UNITED STATES PATENTS

| | | | |
|---|---|---|---|
| 596,991 | 1/1898 | Garretson | 75—73 |
| 813,824 | 2/1906 | Pollard | 75—73 |
| 1,803,663 | 5/1931 | Carson | 75—73 |
| 1,817,043 | 8/1931 | Stout | 75—73 |
| 2,223,569 | 12/1940 | Lohse | 75—73 X |
| 2,557,650 | 6/1951 | Gilliand | 75—40 |
| 3,326,671 | 6/1967 | Worner | 75—73 X |
| 3,281,236 | 10/1966 | Meissner | 75—73 X |

FOREIGN PATENTS 159,036  11/1963  Russia.

L. DEWAYNE RUTLEDGE, *Primary Examiner.*

J. E. LEGRU, *Assistant Examiner.*

U.S. Cl. X.R.

75—10, 74